United States Patent
Becker et al.

(10) Patent No.: US 8,530,401 B2
(45) Date of Patent: Sep. 10, 2013

(54) ANTIFOAM COMPOSITIONS COMPRISING A MIXTURE OF ORGANOPOLYSILOXANES

(75) Inventors: Richard Becker, Burghausen (DE); Willibald Burger, Burghausen (DE); Holger Rautschek, Nuenchritz (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/643,650

(22) PCT Filed: Apr. 4, 2011

(86) PCT No.: PCT/EP2011/055191
§ 371 (c)(1), (2), (4) Date: Oct. 26, 2012

(87) PCT Pub. No.: WO2011/134746
PCT Pub. Date: Nov. 3, 2011

(65) Prior Publication Data
US 2013/0040871 A1 Feb. 14, 2013

(30) Foreign Application Priority Data
Apr. 28, 2010 (DE) .......................... 10 2010 028 306

(51) Int. Cl.
C11D 9/36 (2006.01)
(52) U.S. Cl.
USPC ........... 510/347; 510/122; 510/222; 510/228; 510/343; 510/466; 510/486; 510/511; 516/117; 516/118; 516/120
(58) Field of Classification Search
USPC ................ 510/122, 222, 228, 343, 347, 466, 510/486, 511; 516/117, 118, 120
See application file for complete search history.

(56) References Cited

U.S. PATENT DOCUMENTS

| | | | |
|---|---|---|---|
| 2,632,736 A | 3/1953 | Currie | |
| 2,676,182 A | 4/1954 | Daudt et al. | |
| 3,373,327 A | 3/1968 | Teuber | |
| 3,560,401 A | 2/1971 | O'Hara et al. | |
| 4,145,308 A | 3/1979 | Simoneau et al. | |
| 4,395,352 A | 7/1983 | Kulkarni et al. | |
| 4,639,489 A | 1/1987 | Aizawa et al. | |
| 4,919,843 A | 4/1990 | Innertsberger et al. | |
| 5,055,229 A | 10/1991 | Pelton et al. | |
| 5,486,306 A * | 1/1996 | L'Hostis et al. | 516/117 |
| 6,197,914 B1 | 3/2001 | Kaeppler et al. | |
| 6,605,183 B1 | 8/2003 | Rautschek et al. | |
| 2004/0106749 A1 | 6/2004 | Burger et al. | |
| 2006/0160908 A1 | 7/2006 | Rautschek et al. | |
| 2008/0200608 A1 | 8/2008 | Burger et al. | |
| 2009/0137446 A1 | 5/2009 | Rautschek et al. | |

FOREIGN PATENT DOCUMENTS

| | | |
|---|---|---|
| DE | 2925722 A1 | 2/1981 |
| DE | 102004051897 A1 | 4/2006 |
| EP | 0163398 A1 | 4/1985 |
| EP | 0163541 A2 | 12/1985 |
| EP | 0217501 A2 | 4/1987 |
| EP | 0273448 A2 | 7/1988 |
| EP | 0301531 A2 | 2/1989 |
| EP | 0434060 A2 | 6/1991 |
| EP | 0726086 A2 | 8/1996 |
| EP | 0887097 A1 | 12/1998 |
| EP | 0927733 A1 | 7/1999 |
| EP | 1060778 A1 | 12/2000 |
| EP | 1076073 A1 | 2/2001 |
| EP | 1167456 A1 | 1/2002 |
| EP | 1424117 A2 | 6/2004 |
| EP | 1681083 A1 | 7/2006 |
| EP | 1750524 B1 | 2/2007 |
| GB | 2350117 A | 11/2000 |
| WO | 9800216 A1 | 1/1998 |
| WO | 2005117611 A1 | 12/2005 |
| WO | 2006128624 A1 | 12/2006 |

OTHER PUBLICATIONS

Parsonage J. R.; Kendrick, D.A. "Silicate Sources of Polyorganosiloxane Materials: A Brief Review" The Science of Materials and Polymers Group, University of Greenwich, London, UK SE18 6PF) Spec. Publ.—R. Soc. Chem. 166, 98-106, 1995.

* cited by examiner

*Primary Examiner* — Charles Boyer
(74) *Attorney, Agent, or Firm* — Brooks Kushman P.C.

(57) ABSTRACT

Superior defoamer compositions contain a low viscosity linear organopolysiloxane, a higher viscosity, optionally branched organopolysiloxane, a polyethersiloxane with a low cloud point, and both colloidal silica and fumed silica.

11 Claims, No Drawings

ANTIFOAM COMPOSITIONS COMPRISING A MIXTURE OF ORGANOPOLYSILOXANES

CROSS-REFERENCE TO RELATED APPLICATIONS

This application is the U.S. national phase of PCT Appln. No. PCT/EP2011/055191 filed Apr. 4, 2011, which claims priority to German Patent Application No. 10 2010 028 306.1 filed Apr. 28, 2010, which are incorporated herein by reference.

BACKGROUND OF THE INVENTION

1. Field of the Invention

The invention relates to compositions comprising organosilicon compounds having different viscosities, to processes for preparing them, and to the use thereof as defoamers.

2. Description of the Related Art

In many liquid systems, more particularly in aqueous systems, which include surface-active compounds as desired or else unwanted constituents, it is possible for problems to occur as a result of foaming if these systems come into more or less intensive contact with gaseous substances, such as during the gassing of wastewaters, during the intensive stirring of liquids, during distillation, washing or coloring operations, or during dispensing processes, for example.

This foam can be controlled by mechanical means or through the addition of defoamers. Siloxane-based defoamers have proven particularly appropriate. Defoamers based on siloxanes are prepared according to U.S. Pat. No. 3,383,327 A, for example, by heating hydrophilic silica in polydimethylsiloxanes. Using basic catalysts allows the effectiveness of such defoamers to be improved, as disclosed in U.S. Pat. No. 3,560,401 A. An alternative is to disperse hydrophobized silica in a polydimethylsiloxane, in accordance with DE 29 25 722 A1, for example.

Nevertheless, the effectiveness of the resulting defoamers is usually in need of improvement. Thus U.S. Pat. No. 4,145,308, for example, describes a defoamer preparation which as well as a polydiorganosiloxane and silica also comprises a copolymer made up of $(CH_3)_3SiO_{1/2}$ and $SiO_2$ units.

Copolymers made up of $(CH_3)_3SiO_{1/2}$ and $SiO_2$ units are said to be advantageous also in combination with siloxanes which carry terminal long alkyl groups, as described in EP-A-301 531 (corresponding U.S. Pat. No. 4,919,843 A). In these formulations, mixtures of fumed and precipitated silicas are used as well.

EP-B-726 086 achieves enhanced effectiveness for the defoamer formulation by using a mixture of pretreated hydrophobized silica and silica hydrophobized in situ.

The use of partly crosslinked, in some cases already rubberlike polydimethylsiloxanes is said to contribute to an increase in defoamer effect. In this regard, reference may be made, for example, to U.S. Pat. No. 2,632,736, EP-B 163 541, EP-B 217 501, EP-A 273 448 and EP-A 434 060. These products, though, are generally of very high viscosity and are difficult to handle or to process further.

Alternatively to partially crosslinked siloxanes, linear polydimethylsiloxanes of high viscosity are also used in defoamer formulations. According to the teaching of U.S. Pat. No. 4,395,352, a marked improvement in defoamer effect is achieved simply by using polydimethylsiloxanes having a viscosity of up to 30,000 mm²/s in the formulations.

EP-B 163 398 uses oils up to a viscosity of up to 200,000 mm²/s for enhancing the defoamer effect in mixtures with oils at 100-5000 mm²/s, silicone resin, and silica. In this case the defoamer effect can be improved simply by admixing the high-viscosity siloxane subsequently.

According to EP 1 750 524 B1, the defoaming effect is made better, in contrast, if an emulsion with a defoamer based on a diorganosiloxane having a viscosity of 1000-10,000 mPas is admixed with a diorganosiloxane having a viscosity of 100-1050 mPas.

In strongly foaming, surfactant-rich systems, however, the known defoamer formulations do not always have a sufficiently long-lasting effectiveness and compatibility, or else, owing to the high viscosity on the basis of the degree of branching or degree of crosslinking attained, they are difficult to handle.

SUMMARY OF THE INVENTION

An object was to provide defoamer formulations with which the disadvantages identified above are avoided. These and other objects are attained by compositions containing a low viscosity linear organopolysiloxane, a higher viscosity, optionally branched organopolysiloxane, a polyethersiloxane with a low cloud point, and both colloidal silica and fumed silica.

DETAILED DESCRIPTION OF THE PREFERRED EMBODIMENTS

The invention provides compositions comprising (A) organopolysiloxanes having a viscosity of 10-350 mm²/s at 25° C. and 1013 hPa, comprising units of the formula

in which

R² may be identical or different and denotes a monovalent, optionally halogenated hydrocarbon radical having 1-30 carbon atoms, preferably 1-18 carbon atoms, or a hydrogen atom, R³ may be identical or different and denotes a hydrogen atom or a monovalent hydrocarbon radical having 1-4 carbon atoms, a is 0, 1, 2 or 3, and b is 0, 1, 2 or 3, with the proviso that the sum a+b is ≦3 and in more than 50% of all the units of the formula (I) in the organopolysiloxane (A), the sum a+b is 2, the viscosity of the organopolysiloxanes (A) being determined by the number of units of the formula (I), (B) organopolysiloxanes having a viscosity of 500-200,000 mm²/s at 25° C. and 1013 hPa, comprising units of the formula

in which R² and R³ have the definition indicated for them above, c is 0, 1, 2 or 3, and d is 0, 1, 2 or 3, with the proviso that the sum c+d is ≦3 and in more than 50% of all the units of the formula (II) in the organopolysiloxane (B), the sum c+d is 2, the viscosity of the organopolysiloxanes (B) being determined by the number of units of the formula (II), (C) precipitated silicas having a BET surface area of 20-500 m²/g (D) fumed silicas having a BET surface area of 100-500 m²/g (E) polyethersiloxanes having a cloud point of less than 50° C.

(F) optionally, organopolysiloxane resins comprising units of the formula $$R_e(R^1O)_f SiO_{(4-e-f)/2} \quad (III),$$

in which $R^2$ and $R^3$ have the definition indicated for them above, e is 0, 1, 2 or 3, and f is 0, 1, 2 or 3, with the proviso that the sum e+f is 3 and in less than 50% of all the units of the formula (III) in the organopolysiloxane resin, the sum e+f is 2, (G) optionally, organopolysiloxanes different from (A) and (B), and (H) optionally, water-insoluble organic compounds.

The radicals R and $R^2$ may be alkyl radicals, cycloalkyl radicals, alkenyl radicals, aryl radicals or aralkyl radicals. Examples of radicals R and $R^2$ are the methyl radical, the ethyl radical, the octyl radical, the 2-propenylphenyl radical, and the phenyl radical. Examples of substituted radicals R and $R^2$ are halogenated hydrocarbon radicals, such as the 3,3,3-trifluoropropyl radical. Particularly preferred as radicals R and $R^2$ is the methyl radical.

Examples of radicals $R^1$ and $R^2$ are the hydrogen atom, the methyl radical, and the ethyl radical. Particularly preferred as radical $R^3$ is the hydrogen atom.

The organopolysiloxanes (A) and (B) preferably contain on average 30-500 ppm by weight of Si-bonded OH groups; in other words, in 0.013 to 0.22 mol % of the units of the formula (I) and (II), respectively, b is 1 and d is 1 and $R^3$ is H, and in 99.78 to 99.987 mol % of units of the formula (I) and (II), respectively, b is 0 and d is 0.

The organopolysiloxane (A) preferably has a viscosity (measured at 25° C. and 1013 hPa) of from 50-200 mm²/s, and the organopolysiloxane (B) preferably has a viscosity (measured at 25° C. and 1013 hPa) of preferably from 1000-20,000 mm²/s.

As organopolysiloxanes (A) it is preferred to use linear organopolysiloxanes of the general formula $$R^2_{3-g}(R^3O)_g Si-[OSiR^2_2]_n-OSi(OR^3)_g R^2_{3-g} \quad (IV),$$

in which $R^2$ and $R^3$ have the definition indicated for them above, g is 0 or 1, and n is an integer and has a value such that the viscosity of the organopolysiloxanes (A) is 10-350 mm²/s at 25° C. and 1013 hPa, with the proviso that the organopolysiloxanes of the formula (IV) have on average an Si-bonded OH group content of 30-500 ppm by weight.

As organopolysiloxanes (B) it is preferred to use substantially linear organopolysiloxanes of the general formula $$R^2_{3-h}(R^3O)_h Si-[OSiR^2_2]_m-OSi(OR^3)_h R^2_{3-h} \quad (V),$$

in which $R^2$ and $R^3$ have the definition indicated for them above, h is 0 or 1, and m is an integer and has a value such that the viscosity of the organopolysiloxanes (A) is 500-200,000 mm²/s at 25° C. and 1013 hPa, with the proviso that the organopolysiloxanes of the formula (V) have on average an Si-bonded OH group content of 30-500 ppm by weight.

The weight ratio of component (A) to component (B) is preferably 95:5 to 5:95, more particularly 80:20 to 20:80.

As precipitated silica (C) it is preferred to use silica having a BET surface area of 50-200 m²/g. The precipitated silica may be hydrophilic; pretreated hydrophobic silicas may also be used. Products of these kinds are known to those skilled in the art and are described in EP 726 086 A2, for example.

The compositions of the invention preferably comprise precipitated silica (C) in amounts of 0.1 to 20 parts by weight, more preferably 1 to 10 parts by weight, based in each case on 100 parts by weight of component (A) and (B).

The fumed silica (D) has a BET surface area of 100-500 m²/g, preferably 200-400 m²/g. The fumed silica may be hydrophilic; pretreated hydrophobic silicas may also be used. Products of these kinds are known to those skilled in the art and are described in EP 726 086 A2, for example.

The compositions of the invention preferably comprise fumed silica (D) in amounts of 0.1 to 20 parts by weight, more preferably 1 to 10 parts by weight, based in each case on 100 parts by weight of component (A) and (B).

The weight ratio of component (C) to component (D) is preferably 95:5 to 5:95, more particularly 80:20 to 20:80.

As component (E) it is possible to use linear polyethersiloxanes (E) in which the polyether radicals are pendantly SiC-bonded to linear siloxane chains via hydrocarbon radicals, preferably divalent hydrocarbon radicals. Linear polyether-polysiloxane copolymers of this kind are described in GB 2 350 117 A, for example.

The polyethersiloxanes preferably have a siloxane backbone with 10-200, more preferably 20-100 siloxane units, with 2-20%, more preferably 5-15% of the siloxane units carrying an SiC-bonded polyether radical Z of the formula $$-R^4-O-[CH_2-CH_2O]_x-[CH_2-CH(CH_3)O]_y- \\ R^5 \quad (VI)$$

where x has a value of 0-100, preferably 5-50, y has a value of 5-100, preferably 5-50, the ratio x:y being 4:1 to 0:1, $R^4$ denotes a divalent hydrocarbon radical having 1-10 carbon atoms, preferably a $C_{1-10}$ alkylene radical, $R^5$ is identical or different and denotes a hydrogen atom or an optionally substituted hydrocarbon radical having 1-30 carbon atoms or a carboxyl radical of the formula $-C(O)R^6$, where the radical $R^6$ is a $C_{1-3}$ alkyl radical, such as methyl or ethyl radical.

$R^4$ is preferably a radical of the formula $-CH_2-CH_2-CH_2-$.

The radical $R^5$ is preferably a hydrogen atom or a monovalent hydrocarbon radical having 1-18 C atoms. Examples of radicals $R^5$ are a hydrogen atom or a $C_{1-6}$ alkyl radical.

Preference is given to using polyethersiloxanes (E) of the general formula $$R^2_3Si-[OSiR^2_2]_o-[OSiZR^2]_p-OSiR^2_3 \quad (VII),$$

where the polyether radical Z and the radical $R^2$ have the definition indicated for them above, o is an integer from 5 to 500, preferably 10 to 100, and p is an integer from 1 to 50, preferably 2 to 15.

In formula (VII) the sum o+p is preferably 20 to 200, more preferably 20 to 100, with preferably on average 2-20%, more particularly 5-15%, of the siloxane units o+p having an SiC-bonded polyether radical Z.

The cloud point of the polyethersiloxanes (E) is measured in accordance with DIN EN 1890 Method A.

The cloud point of the polyethersiloxanes (E) is preferably less than 40° C., more preferably less than 30° C., and most preferably less than 25° C., i.e., the polyethersiloxanes are less than 1% soluble in water at 25° C.

As component (E) it is also possible to use branched polyethersiloxanes. Examples of branched polyethersiloxanes are those in which the polyether radicals are pendantly SiC-bonded to linear siloxane chains via hydrocarbon radicals, preferably divalent hydrocarbon radicals, and these linear siloxane chains are joined to one another via pendant organic bridges. Examples of these organic bridges are SiC-bonded linear or branched organic radicals, preferably divalent hydrocarbon radicals, which may contain one or more heteroatoms selected from the group of oxygen atoms and nitrogen atoms, such as alkylene radicals, SiC-bonded polyether radicals which are bonded to the siloxane chains via alkylene radicals, and SiC-bonded divalent hydrocarbon radicals, such as alkylene radicals, which contain polyether groups and urethane groups.

Especially suitable as branched polyethersiloxanes (E) are branched polyether-polysiloxane copolymers, of the kind described as a component of defoamers in EP 1 076 073 A1, EP 1 424 117 A2 or WO 2006/128624 A1, for example.

Preferred branched polyether-polysiloxane copolymers are those in which the siloxane chains are joined to one another via pendant divalent SiC-bonded hydrocarbon radicals which contain polyether radicals and urethane groups. These polyether-polysiloxane copolymers and their preparation are described in WO 2006/128624 A1, more particularly at page 3, line 8 to page 13, line 38 (incorporated by reference).

The compositions of the invention preferably comprise polyethersiloxanes (E) in amounts of 1 to 200 parts by weight, more preferably 2 to 100 parts by weight, based in each case on 100 parts by weight of component (A) and (B).

The optionally used component (F) comprises silicone resins composed of units of the formula (I), with the sum a+b being 2 in preferably less than 5% of the units in the resin.

With particular preference, component (F) comprises organopolysiloxane resins which consist substantially of $R^2_3SiO_{1/2}$ (M) units and $SiO_{4/2}$ (O) units, where $R^2$ has the definition indicated for it above; these resins are also referred to as MQ resins. The molar ratio of M to Q units is preferably in the range from 0.5 to 2.0, more preferably in the range from 0.6 to 1.0. These silicone resins may further contain up to 10% by weight of free Si-bonded hydroxyl or alkoxy groups.

The organopolysiloxane resins (F) preferably have a viscosity of more than 1000 mPas at 25° C. or are solids. The weight-average molecular weight $M_w$ determined by gel permeation chromatography (and relative to a polystyrene standard) of these resins is preferably 200 to 200,000 g/mol, more preferably 1000 to 20,000 g/mol.

Component (F) are commercial products and/or can be prepared in accordance with methods that are commonplace within silicon chemistry, as for example in accordance with "Parsonage, J. R.; Kendrick, D. A. (Science of Materials and Polymers Group, University of Greenwich, London, UK SE18 6PF) Spec. Publ.—R. Soc. Chem. 166, 98-106, 1995", U.S. Pat. No. 2,676,182 or EP-A 927 733.

The compositions of the invention preferably comprise organopolysiloxane resins (F) in amounts of 0.5 to 30 parts by weight, more preferably 0.1 to 10 parts by weight, based in each case on 100 parts by weight of component (A) and (B).

In one preferred embodiment the composition of the invention comprises as component (G), in addition, organopolysiloxanes different from (A) and (B) and composed of units of the general formula

  (VIII), in which
$R^2$ has the definition indicated for it above,
$R^5$ may be identical or different and denotes a monovalent, linear and/or branched hydrocarbon radical having at least 6 carbon atoms, preferably 6-30 carbon atoms,
k is 0, 1, 2 or 3, and
l is 0, 1, 2 or 3, on average 0.005 to 0.5, with the proviso that the sum k+l is 3, on average 1.9 to 2.1.

Organopolysiloxanes (G) of this kind are obtainable for example by alkali-catalyzed condensation of silanol-terminated polydimethylsiloxanes with a viscosity of 50 to 50,000 mPa·s at 25° C. and aliphatic alcohols having at least 6 carbon atoms, such as isotridecyl alcohol, n-octanol, stearyl alcohol, 4-ethylhexadecanol or eicosanol.

The compositions of the invention preferably comprise organopolysiloxanes (G) in amounts of 0.5 to 30 parts by weight, more preferably 1 to 10 parts by weight, based in each case on 100 parts by weight of component (A) and (B).

In addition to components (A) to (G), the compositions of the invention may comprise further substances, of the kind also used hitherto in defoamer formulations.

Examples of further substances are water-insoluble organic compounds (H). The term "water-insoluble" refers for the purposes of the present invention to a solubility in water at 25° C. and under a pressure of 101.325 kPa of not more than 3 percent by weight.

The water-insoluble organic compounds are preferably compounds having a boiling point of greater than 100° C. under the pressure of the surrounding atmosphere, in other words at 900 to 1100 hPa, more particularly those selected from mineral oils, natural oils, isoparaffins, polyisobutylenes, residues from the oxo synthesis of alcohols, esters of low molecular weight synthetic carboxylic acids, fatty acid esters, such as octyl stearate and dodecyl palmitate, for example, fatty alcohols, ethers of low molecular weight alcohols, phthalates, esters of phosphoric acid, and waxes.

The compositions of the invention preferably comprise water-insoluble organic compound (H) in amounts of 0 to 1000 parts by weight, more preferably 0 to 100 parts by weight, based in each case on 100 parts by weight of the total weight of components (A) to (G).

The compositions of the invention are preferably viscous, clear to opaque, colorless liquids.

The compositions of the invention preferably have a viscosity of preferably 100 to 2,000,000 mPas, more 1000 to 50,000 mPas in each case at 25° C. and 101.325 kPa.

The compositions of the invention may be solutions, dispersions or powders.

The compositions of the invention can be prepared by known methods, such as, for example, by the mixing of all of the components, for example, using high shearing forces in colloid mills, dissolvers or rotor-stator homogenizers. The mixing operation may take place under reduced pressure, in order to prevent the mix incorporation of air present, for example, in highly disperse fillers, such as the silicas (C) and (D). Subsequently, where necessary, the in situ hydrophobizing of the silicas (C) and/or (D) may take place.

The invention further provides emulsions comprising compositions of the invention, emulsifiers, and water.

Where the compositions of the invention are emulsions, it is possible to use any emulsifiers known to the skilled person for the preparation of silicone emulsions, such as anionic, cationic or nonionic emulsifiers, for example. It is preferred to use emulsifier mixtures, in which case there ought to be at least one nonionic emulsifier present, such as sorbitan fatty acid esters, ethoxylated sorbitan fatty acid esters, ethoxylated fatty acids, ethoxylated linear or branched alcohols having 10 to 20 carbon atoms, and/or glycerol esters present. As thickeners it is possible, furthermore, for known compounds, such as polyacrylic acid, polyacrylates, cellulose ethers, such as carboxymethylcellulose and hydroxyethylcellulose, natural thickeners, such as xanthan gum, for example, and polyurethanes, and also preservatives and other customary additions known to the skilled person, to be added.

The continuous phase of the emulsions of the invention is preferably water. However, compositions of the invention can also be prepared in the form of emulsions where the continuous phase is formed by components (A) to (G) or is formed by water-insoluble organic compound (H). These may also be multiple emulsions.

Processes for preparing silicone emulsions are known. Preparation takes place typically by simple stirring together of all the constituents and optional subsequent homogenization with jet dispersers, rotor-stator homogenizers, colloid mills or high-pressure homogenizers.

Where the composition of the invention comprises emulsions, preference is given to oil in water emulsions comprising 5% to 50% by weight of components (A) to (H), 1% to 20% by weight of emulsifiers and thickeners, and 30% to 94% by weight of water.

The compositions of the invention can also be formulated as free-flowing powders. These powders are preferred in the context, for example, of application in powder laundry detergents. The preparation of these powders, starting from the mixture of components (A) to (E), optionally (F), optionally (G), and optionally (H), takes place in accordance with methods that are known to the skilled person, such as spray drying or agglomerative granulation, and using adjuvants known to the skilled person.

The invention further provides powders comprising compositions of the invention and carrier materials.

The powders of the invention comprise preferably 2% to 20% by weight of the composition of the invention comprising components (A) to (H). Carriers employed may be, for example zeolites, sodium sulfate, cellulose derivatives, urea, and sugars. The powders of the invention comprise 50% to 95% by weight of carrier materials. Further constituents of the powders of the invention may be, for example, waxes, or organic polymers, of the kind described in EP-A 887 097 and EP-A 1 060 778, for example.

The present invention additionally provides detergents and care compositions, such as fabric softeners, for example, comprising the compositions of the invention or the compositions of the invention in the form of emulsions or in the form of powders.

The compositions of the invention can be used wherever compositions based on organosilicon compounds have also been used to date. More particularly they can be used as defoamers.

Further provided by the present invention is a method for defoaming and/or for preventing the foaming of media, by mixing the compositions of the invention or emulsions or powders thereof with the media.

Surprisingly it has been found that the effectiveness and handling properties of the defoamer formulations of the invention are substantially improved by the specific mixture of different organopolysiloxanes, silicas, and polyethersiloxanes. The defoamer formulations of the invention are notable in particular for rapid and uniform dispersal in the foaming system, for very good handling properties and meterability, and also for a high level of effectiveness (rapid effect and long-term effect).

The addition of the composition of the invention to the foaming media may take place directly, in solution in suitable solvents, such as toluene, xylene, methyl ethyl ketone or tert-butanol, as a powder, or as an emulsion. The amount required to achieve the desired defoamer effect is guided, for example, by the nature of the medium, by the temperature, and by the turbulence that occurs.

The compositions of the invention are added preferably in amounts of 0.1 ppm by weight to 1% by weight, more preferably in amounts of 1 to 100 ppm by weight, to the foaming medium.

The method of the invention is preferably carried out at temperatures of −10 to +150° C., more preferably 5 to 100° C., under the pressure of the surrounding atmosphere, in other words at about 900 to 1100 hPa. The method of the invention can also be carried out at higher or lower pressures, such as, for example, at 3000 to 4000 hPa or 1 to 10 hPa.

The defoamer compositions of the invention can be used wherever disruptive foam is to be suppressed. This is the case, for example, in nonaqueous systems such as in tar distillation or in petroleum processing. The defoamer compositions of the invention are particularly suitable for controlling foam in aqueous surfactant systems, for use in detergents, for controlling foam in wastewater plants, in textile dyeing processes, in the scrubbing of natural gas, in polymer dispersions, and for defoaming aqueous media that arise in the production of pulp.

The compositions of the invention have the advantage that they are readily manageable as defoamers and that they are distinguished by a high and long-lasting effectiveness in a very wide variety of different media when added in small quantities. This is extremely advantageous from the standpoints both of economics and of the environment.

The method of the invention has the advantage that it is easy to implement and highly economical.

In the examples below, all parts and percentages, unless indicated otherwise, are by weight. Unless indicated otherwise, the following examples are carried out under the pressure of the surrounding atmosphere, in other words at about 1000 hPa, and at room temperature, in other words about 20° C., or at a temperature which comes about when the reactants are combined at room temperature without additional heating or cooling. All of the viscosity figures quoted in the examples are intended to relate to a temperature of 25° C.

Tests of Defoamer Effectiveness

1. Antifoam Index AFI

In an apparatus in accordance with DE-A 25 51 260, 200 ml of a 4% strength by weight aqueous solution of a sodium alkylsulfonate (Mersolat) containing 10 mg of the defoamer under investigation (in solution in 10 times the amount of methyl ethyl ketone) is foamed for 1 minute using two counter-rotating stirrers. Subsequently the collapse of the foam is recorded. The area of the plot of foam height versus time is used to calculate the antifoam index. The lower this index, the more effective the defoamer.

2. Testing in Black Liquor 400 ml of black liquor from the pulp process (hardwood from UPM Kymmene Oy from Kuusankoski, Finland) are pumped in circulation at a pumping rate of 1.5 l/min in a 1000 ml circulation pumping apparatus thermostatted at 80° C.

As soon as the foam level has reached a height of 75 mm, the defoamer (10 mg based on components (A) to (E) and optionally (F) and optionally (G) in the defoamer formulation) is metered in, and a record is made of the foam collapse time and of the lowest foam level reached following addition of defoamer and ensuing foam collapse. The smaller the foam collapse time t1 and the lower the foam level h1, the better the rapid effect of a defoamer. After that, the long-term effect of the defoamer is ascertained, representing the timespan t2 required to get from the lowest foam level to the original foam level (75 mm).

Substances Used:

Siloxane A1: a polydimethylsiloxane terminated with trimethylsiloxy groups and having a viscosity of 100 mm$^2$/s and a silanol group fraction of 120 ppm by weight.

Siloxane A2: a polydimethylsiloxane terminated with trimethylsiloxy groups and having a viscosity of 50 mm²/s and a silanol group fraction of 110 ppm by weight.

Siloxane B1: a polydimethylsiloxane terminated with trimethylsiloxy groups and having a viscosity of 1000 mm²/s and a silanol group fraction of 150 ppm by weight.

Siloxane B2: a polydimethylsiloxane terminated with trimethylsiloxy groups and having a viscosity of 8000 mm²/s and a silanol group fraction of 350 ppm by weight.

Filler C1: a hydrophilic precipitated silica having a surface area of 170 m²/g, obtainable under the name Sipernat 383 DS from Evonik Degussa GmbH Frankfurt am Main.

Filler C2: a hydrophobized precipitated silica having a surface area of 90 m²/g, obtainable under the name Sipernat D10 from Evonik Degussa GmbH Frankfurt am Main.

Filler D1: a hydrophilic fumed silica having a surface area of 300 m²/g, obtainable under the name HDK T30 from Wacker Chemie AG Munich.

Polyethersiloxane E1: this polymer is prepared as follows: 67 g of a siloxane terminated with methyl groups and composed of dimethylsiloxy and hydrogenmethylsiloxy units, having an active hydrogen content of 0.133% and a viscosity of 72 mm²/s (25° C.), are mixed with vigorous stirring with 408 g of an allyl polyether (560 ppm H₂O content) having a PO/EO ratio of 4.0 and an iodine number of 11.2, and the mixture is heated to 100° C. Hydrosilylation is initiated by adding 0.5 ml of a 2% strength solution of hexachloroplatinic acid in isopropanol, and is manifested in a slightly exothermic reaction. The reaction mixture is held at 100 to 110° C. until a clear copolymer is obtained and active hydrogen is no longer detectable. The polysiloxane with pendant polyether groups has a viscosity of 870 mm²/s (25° C.) and a cloud point of less than 25° C.

Organopolysiloxane resin F1: a silicone resin which is solid at room temperature and is made of trimethylsiloxy units and SiO₂ units in a molar ratio of 0.6 1/1, having a weight-average molar mass of 5728 g/mol (relative to polystyrene standard) and an Si-bonded hydroxyl group content of 0.8% by weight.

Organopolysiloxane G1: a condensation product having a viscosity of 180 mPas, prepared from octyldodecanol and from a polydimethylsiloxane terminated with silanol groups and having a viscosity of 40 mPas.

Additive H1: a hydrocarbon mixture with a boiling range of 235-270° C.

Example 1 (Inventive)

21 parts of organopolysiloxane B1, 16 parts of organopolysiloxane B2, 3 parts of filler C1, 1 part of filler D1, 1 part of organopolysiloxane resin F1, and 1 part of organopolysiloxane G1 are mixed and homogenized and heated at 150° C. for 4 hours in the presence of 1500 ppm of KOH. Then 52 parts of organopolysiloxane A1 and 6 parts of polyethersiloxane E1 are added and mixed in homogenously.

The viscosity of the composition and the antifoam index are indicated in table 1.

Comparative Example 1

No Polyethersiloxane E parts of organopolysiloxane B1, 16 parts of organopolysiloxane B2, 3 parts of filler C1, 1 part of filler D1, 1 part of organopolysiloxane resin F1, and 1 part of mineral oil H1 are mixed and homogenized and heated at 150° C. for 4 hours in the presence of 1500 ppm of KOH. Then 52 parts of organopolysiloxane A1 are added and mixed in homogenously.

The viscosity of the composition and the antifoam index are indicated in table 1.

Comparative Example 2

No Filler C 37 parts of organopolysiloxane B2, 3 parts of filler D1, 1 part of organopolysiloxane resin F1, and 1 part of organopolysiloxane G1 are mixed and homogenized and heated at 150° C. for 4 hours in the presence of 1500 ppm of KOH. Then 52 parts of organopolysiloxane A1 and 6 parts of polyethersiloxane E1 are added and mixed in homogenously.

The viscosity of the composition and the antifoam index are indicated in table 1.

Comparative Example 3

No Organosiloxane A, No Filler D 79 parts of organopolysiloxane B1, 10 parts of filler C1, 1 part of organopolysiloxane resin F1, and 1 part of organopolysiloxane G1 are mixed and homogenized and heated at 150° C. for 4 hours in the presence of 1500 ppm of KOH. Then 4 parts of filler C2 and 6 parts of polyethersiloxane E1 are added and mixed in homogenously.

The viscosity of the composition and the antifoam index are indicated in table 1.

TABLE 1

Antifoam index and viscosities of example 1 and comparative examples C1-C3

| Example/comparative experiment | Viscosity in mPas | Antifoam index |
|---|---|---|
| 1 (inventive) | 1100 | 510 |
| C1 (not inventive) | 1020 | 640 |
| C2 (not inventive) | 2490 | 1420 |
| C3 (not inventive) | 7500 | 1320 |

Example 2

27 parts of organopolysiloxane B2, 2 parts of filler D1, 1 part of organopolysiloxane resin F1, and 1 part of mineral oil H1 are mixed and homogenized and heated at 150° C. for 4 hours in the presence of 1500 ppm of KOH. Then 60 parts of organopolysiloxane A1, 6 parts of filler C2, and 8 parts of polyethersiloxane E1 are added and mixed in homogenously.

Comparative Example 4

Without Polyethersiloxane E 27 parts of organopolysiloxane B2, 2 parts of filler D1, 1 part of organopolysiloxane resin F1, and 1 part of mineral oil H1 are mixed and homogenized and heated at 150° C. for 4 hours in the presence of 1500 ppm of KOH. Then 60 parts of organopolysiloxane A1 and 6 parts of filler C2 are added and mixed in homogenously.

Comparative Example 5

Without Filler C 27 parts of organopolysiloxane B2, 2 parts of filler D1, 1 part of organopolysiloxane resin F1, and 1 part of mineral oil H1 are mixed and homogenized and heated at 150° C. for 4 hours in the presence of 1500 ppm of KOH. Then 60 parts of organopolysiloxane A1 and 8 parts of polyethersiloxane E1 are added and mixed in homogenously.

Comparative Example 6

Without Organosiloxane (A)

27 parts of organopolysiloxane B2, 2 parts of filler D1, 1 part of organopolysiloxane resin F1, and 1 part of mineral oil H1 are mixed and homogenized and heated at 150° C. for 4 hours in the presence of 1500 ppm of KOH. Then 6 parts of filler C2 and 8 parts of polyethersiloxane E1 are added and mixed in homogenously.

The inventive and comparative examples above are metered in in undiluted form, by means of a pipette, for testing in the black liquor. Apart from comparative example 6, all of the mixtures were meterable without problems.

On account of its high viscosity of 100,000 mPas, comparative example 6 is difficult to manage and is no longer meterable. Since manageability and meterability are absolute requirements for subsequent use in a pulp mill, the high-viscosity comparative example 6 was not tested further in the black liquor.

The results of the effectiveness testing are summarized in table 2.

TABLE 2

Results of testing of defoamer effectiveness in hardwood black liquor

| Example/comparative experiment | Foam collapse time t1 in [s] | Foam level after foam collapse [mm] | Long-term effect t2 in [s] |
|---|---|---|---|
| 2 (inventive) | 14 | 15 | 344 |
| C4 (not inventive, without polyethersiloxane) | 17 | 17 | 282 |
| C6 (not inventive, without filler C) | 20 | 22 | 270 |
| C5 (not inventive, without organosiloxane (A)) | n.a. excessive viscosity | n.a. excessive viscosity | n.a. excessive viscosity |

Example 3

100 parts of a defoamer formulation from example 1 are mixed at 60° C. with 30 parts of sorbitan monostearate (available under the name "Span 60" from Croda GmbH D-Nettetal) and with 20 parts of polyoxyethylene(20)sorbitan monostearates (available under the name "Tween 60" from Uniqema D-Emmerich) and diluted in steps with 500 parts of water. Added to this mixture are 2 parts of a polyacrylic acid (available under the name "Carbopol 934" from BF Goodrich D-Neuss), followed by mixing and addition of a further 345 parts of water and 3 parts of an isothiazolinone-based preservative (available under the name "Acticide MV" from Thor-Chemie, D-Speyer). The emulsion is subsequently homogenized at 100 bar using a high-pressure homogenizer, and adjusted with 10% strength NaOH to a pH of 6-7.

The resulting defoamer emulsion was outstandingly suitable for defoaming aqueous surfactant solutions.

Example 4

35 ml of a 2% strength solution of a high molecular weight copolymer of acrylic acid, methacryloyl stearate, and pentaerythritol diallyl ether (in a molar ratio of 100:2:0.3) (and having, when neutralized, a viscosity of 17 500 mm²/s) were placed in a glass beaker, and 10 g of the defoamer formulation according to example 2 were added slowly, with intensive mixing using a paddle stirrer, to give, after 10 minutes' stirring, an emulsion of the defoamer formulation in the polymer solution. Added to this emulsion with continued stirring were 88.5 g of light sodium carbonate, after which the water was removed under reduced pressure, with continued mixing. Thereafter, 0.5 g of a hydrophilic silica having a BET surface area of 200 m²/g (available from Wacker-Chemie GmbH under the name HDK® N20) was mixed in.

A white, free-flowing powder was obtained. This powder was successfully used for foam prevention in powder laundry detergents or in powder crop-protection concentrates.

The invention claimed is:

1. A defoamer composition comprising
(A) at least one substantially linear organopolysiloxane having a viscosity of 50-200 mm²/s at 25° C. and 1013 hPa, of the formula $$R^2{}_{3-g}(R^3O)_g Si{-}[OSiR^2{}_2]_n{-}OSi(OR^3)_g R^2{}_{3-g} \quad (IV),$$

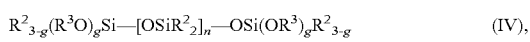

in which
R² are identical or different and denote a monovalent, optionally halogenated hydrocarbon radical having 1-30 carbon atoms or hydrogen,
R³ are identical or different and denote hydrogen or a monovalent hydrocarbon radical having 1-4 carbon atoms,
n is an integer and has an average value such that the viscosity of the organopolysiloxane (A) is 50-200 mm²/s at 25° C. and 1013 hPa,
g is 0 or 1, with the proviso that the organopolysiloxanes of the formula (IV) have on average an Si-bonded OH group content of 30-500 ppm by weight,
(B) at least one organopolysiloxane having a viscosity of 500-200,000 mm²/s at 25° C. and 1013 hPa, comprising units of the formula $$R^2{}_c(R^3O)_d SiO_{(4-c-d)/2} \quad (II),$$

in which R² and R³ have the definition indicated for them above,
c is 0, 1, 2 or 3, and
d is 0, 1, 2 or 3,
with the proviso that the sum c+d is ≦3 and in more than 50% of all the units of the formula (II) in the organopolysiloxane (B), the sum c+d is 2,
(C) at least one precipitated silica having a BET surface area of 20-500 m²/g,
(D) at least one fumed silica having a BET surface area of 100-500 m²/g
(E) at least one polyethersiloxane having a cloud point of less than 50° C.,
(F) optionally, one or more organopolysiloxane resins which consist substantially of R²₃SiO₁/₂ (M) units and SiO₄/₂ (Q) units, where the molar ratio of M units to Q units is in the range of from 0.5 to 2.0,
(G) optionally, one or more organopolysiloxanes different from (A) and (B), and
(H) optionally, one or more water-insoluble organic compounds.

2. The defoamer composition of claim 1, wherein R² contains from 1 to 18 carbon atoms.

3. The defoamer composition of claim 1, wherein organopolysiloxanes (B) comprise substantially linear organopolysiloxanes of the formula $$R^2{}_{3-h}(R^3O)_h Si{-}[OSiR^2{}_2]_m{-}OSi(OR^3)_h R^2{}_{3-h} \quad (V),$$

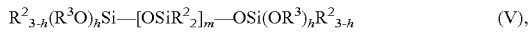

in which m is an integer and has a value such that the viscosity of the organopolysiloxanes (A) is 500-200,000 mm$^2$/s at 25° C. and 1013 hPa, h is 0 or 1, with the proviso that the organopolysiloxanes of the formula (V) have on average an Si-bonded OH group content of 30-500 ppm by weight.

4. The defoamer composition of claim 1, wherein polyethersiloxanes (E) having a cloud point of less than 50° C., comprise linear polyethersiloxanes of the formula

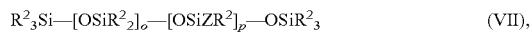 (VII), where the polyether radical Z is a radical of the formula

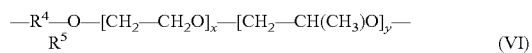 (VI)

where x has a value of 0-100, y has a value of 5-100, the ratio x:y being 4:1 to 0:1, $R^4$ is a divalent hydrocarbon radical having 1-10 carbon atoms, $R^5$ is identical or different and denotes hydrogen or an optionally substituted hydrocarbon radical having 1-30 carbon atoms or a carboxyl radical of the formula —C(O)$R^6$, where the radical $R^6$ is a $C_{1-3}$ alkyl radical, o is an integer from 5 to 500, and p is an integer from 1 to 50.

5. The defoamer composition of claim 2, wherein x is 5-50, y is 5-50, and p is 2 to 15.

6. The defoamer composition of claim 1, wherein polyethersiloxanes (E) comprise polyethersiloxanes having a cloud point of less than 25° C.

7. An aqueous emulsion comprising
a defoamer composition of claim 1, at least one emulsifier, and water.

8. A powder comprising
a defoamer composition of claim 1, and at least one carrier material.

9. A detergent formulation containing at least one detergent, and comprising a composition of claim 1, an emulsion thereof, or a powder thereof.

10. A method for defoaming and/or for preventing the foaming of liquid media, comprising mixing a composition of claim 1, an emulsion thereof, or a powder thereof, with the liquid media.

11. The method of claim 10, wherein the liquid media is formed during the production of pulp.

* * * * *